(12) United States Patent
Kratzenberg et al.

(10) Patent No.: US 6,276,471 B1
(45) Date of Patent: Aug. 21, 2001

(54) DELIVERY CART

(75) Inventors: Wolfgang Kratzenberg, Schauenburg; Siegfried Stein, Vellmar, both of (DE)

(73) Assignee: Expresso Deutschland Transpotgeräte GmbH, Kassel (DE)

( * ) Notice: Subject to any disclaimer, the term of this patent is extended or adjusted under 35 U.S.C. 154(b) by 0 days.

(21) Appl. No.: 09/481,328

(22) Filed: Jan. 12, 2000

Related U.S. Application Data

(63) Continuation-in-part of application No. 08/306,363, filed on Aug. 5, 1997, now abandoned.

(30) Foreign Application Priority Data

Jun. 6, 1997 (DE) .......................................... 297 09 888 U

(51) Int. Cl.⁷ .................................................. B62D 51/04
(52) U.S. Cl. ...................... 180/19.3; 180/6.5; 180/19.1; 180/65.5; 280/47.34
(58) Field of Search ................................. 180/65.1, 65.8, 180/65.5, 6.48, 6.5, 19.1, 19.3, 6.2; 280/47.34; 477/3, 4

(56) References Cited

U.S. PATENT DOCUMENTS

| | | | |
|---|---|---|---|
| 3,380,546 | * 4/1968 | Rabjohn | 180/19.3 |
| 4,697,661 | * 10/1987 | Pajerski et al. | 180/19.3 |
| 5,065,320 | * 11/1991 | Hayashi et al. | 364/424.01 |
| 5,311,880 | * 5/1994 | Lancaster et al. | 128/782 |
| 5,406,674 | * 4/1995 | Lawter et al. | 15/340.2 |
| 5,409,245 | * 4/1995 | Kern et al. | 280/47.34 |
| 5,531,295 | * 7/1996 | Kopman et al. | 280/47.34 |
| 5,555,949 | * 9/1996 | Stallard et al. | 180/6.5 |
| 5,691,584 | * 11/1997 | Toida et al. | 180/65.5 |
| 5,732,786 | * 3/1998 | Fujigaki | 180/19.3 |
| 5,746,282 | * 5/1998 | Fugiwara et al. | 180/6.5 |
| 5,819,863 | * 10/1998 | Zollinger et al. | 180/6.5 |

* cited by examiner

*Primary Examiner*—J. J. Swann
*Assistant Examiner*—James S. McClellan
(74) *Attorney, Agent, or Firm*—Sidley Austin; Brown & Wood, LLP

(57) ABSTRACT

A delivery cart including a chassis, one or two castors pivotable about a vertical axis and two support wheels for supporting the chassis on a ground, a substantially vertically extending displacement stirrup attached to the chassis, a gearless, load-actuated reversible electric motor, formed integrally with the respective wheels, and a control system for controlling power supply to the electric motors and including sensors for sensing a displacement force or a steering force applied to the cart, and a free-programmable control unit for controlling power supply to the electric motors, in accordance with the one of a displacement force and a steering force.

18 Claims, 7 Drawing Sheets

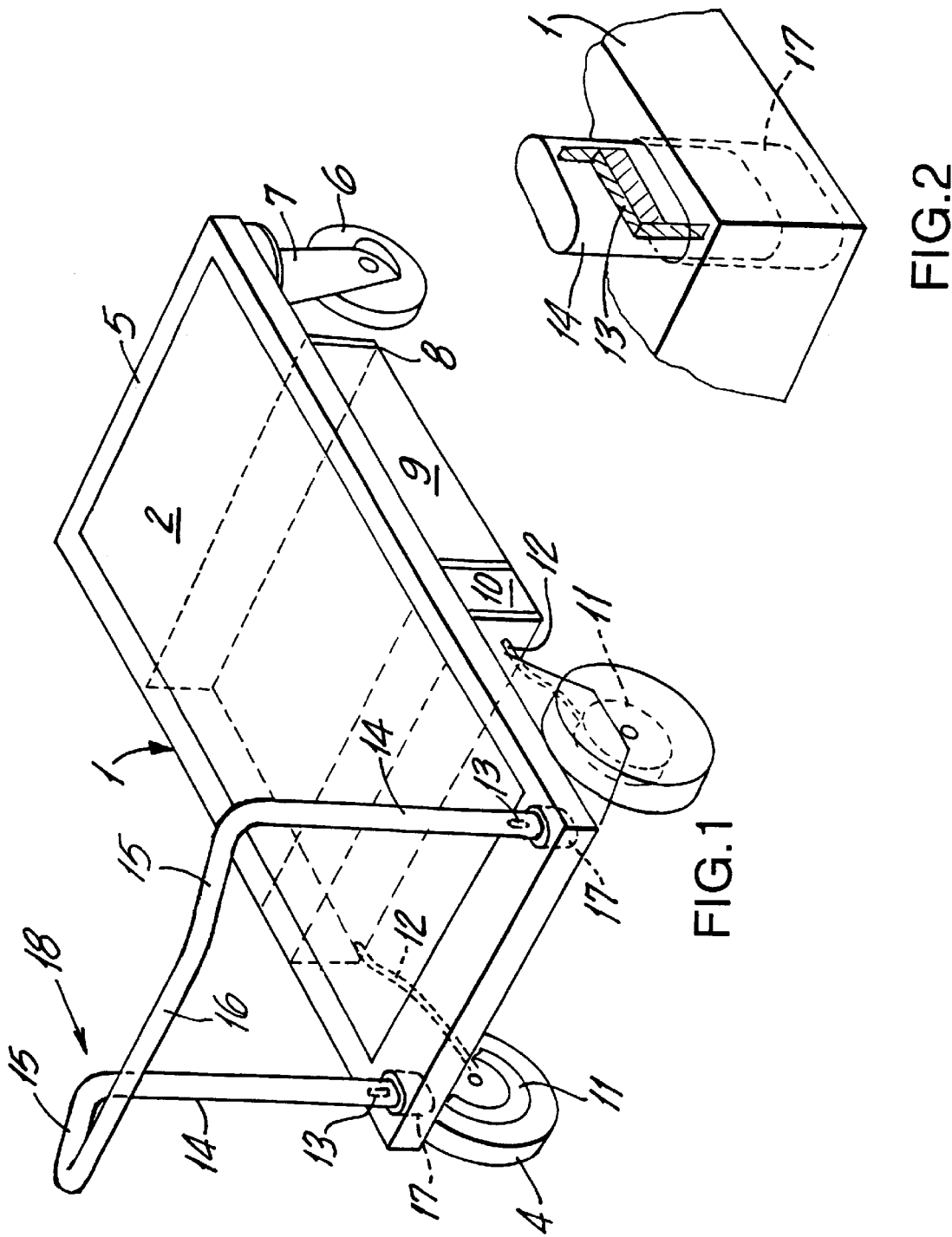

DELIVERY CART

RELATED APPLICATION

This application is a continuation-in-part of application Ser. No. 08/306,363, filed Aug. 5, 1997, now abandoned.

BACKGROUND OF THE INVENTION

1. Field of the Invention

The present invention relates to a delivery cart which includes a chassis formed of longitudinal and cross beams, at least one castor pivotable about a vertical axis and two support wheels for supporting the chassis on a ground, a displacement stirrup attached to the chassis and towering above the chassis, gearless, load-actuated reversible electric motor means associated with at least one castor or two support wheels and formed integrally with the castor or two support wheels, a power source for the electric motor means, and control means for controlling power supply to the electric motor means and including sensor means for sensing a displacement force and/or a steering force applied to the cart, and a control unit for controlling power supply to the electric motor means in accordance with the displacement force and/or a steering force.

2. Description of the Prior-Art.

German Publication DE-OS 195 05 309 describes a motor-driven delivery cart for delivering or distribution of large quantity of goods to a plurality of receiving stations, which permits to deliver a large quantity of different materials with a minimum of manual efforts on the part of a deliverer. Such a delivery cart spares the delivery person from expenditure of substantial physical efforts for moving the cart. In this cart, the power supply to the drive motor is controlled in accordance with a push or pulling force applied to the stirrup by the cart user. Such control not only insures matching of the driving power with the speed intended by the cart operator, independent from the area of the load, i.e., instantaneous total weight of the cart, and independent from whether the cart track rises or falls but also results in a reduced energy consumption. In the known delivery cart, the stirrup is formed as a motor vehicle steering wheel which is connected with the chassis by a single beam or bar, and the cart is provided with sensors for sensing the direction and the magnitude of the beam deformation for controlling the power supply to the electric motors. The use of sensors for sensing the pressure, displacement and deformation forces and for generating appropriate control signals for controlling the power supply to the electric motors is connected with substantial expenditures and considerably limits the possibilities of a correct determination of the drive actuation threshold.

Further, the auxiliary drive and its control, which are used in known delivery carts with an auxiliary power assist, are characterized by an unchangeable construction designed for a specific delivery cart and, therefore, can be used only with newly produced carts. In view of the durability of the carts and in the interest of the economical use of the auxiliary power assist means for a delivery cart, it is desirable to standardize the necessary components so that they can also be used with the already produced carts.

Accordingly, an object of the present invention is an auxiliary drive for a motor-driven delivery cart of the above described type which can be produced with as small as possible technical expenditures and with small as possible costs.

Another object of the present invention is to provide control means which can be used with difference types of the delivery carts, including already operational carts.

A further object of the present invention is to provide a delivery cart with power assist means and which would insure its ergonomically favorable handling and which is optimally maneuverable and operationally reliable.

SUMMARY OF THE INVENTION

This and other objects of the present invention, which will become apparent hereinafter, are achieved by forming the control unit, which controls the power supply to the electric motors, as a free programmable electronic unit. The free programmable control unit, in comparison with control units with an invariable program, has an advantage which consists in that it can be used with different types of delivery carts and can be programmed in accordance with the type of the cart and its intended use, which makes possible the use of the free programmable control unit in the already available carts. The free programmable control units permit to adapt the delivery carts to changing operational conditions. Further, such a control unit can be formed of standardized components.

The delivery cart and the control unit according to the present invention can be so formed that under all practically occurring operational conditions, the cart with a small load is freely movable along a flat track which does not have an increased rolling resistance, and the auxiliary drive is only then actuated when a displacement force applied by the cart operator and/or a braking force exceed a certain threshold.

According to a preferred embodiment of the delivery cart according to the present invention, control unit comprises an electronic computer and a free programmable memory. The electric motor means comprises two electric motors associated with the two support wheels, and the sensor means includes at least two sensors, with the computer having a separate input for each of the two sensors and a separate output for each of the two electric motors. The free programmable memory stores data used for actuating the electric motor means and for controlling power supply thereto and including an allowable force to be applied by the user and variably predetermined operational characteristics of the cart.

In this way, by an appropriate programming, the auxiliary drive operation can be adapted to predetermined and desirable drive characteristics of the cart, independent from the use conditions of the cart, the cart load, track characteristics and the like.

To insure that the cart would have the predetermined and desirable drive characteristics, the program of the control unit can envisage that the drive motors, which are usually formed as gearless electric motors formed integrally with respective running wheels, are actuated simply upon being fed with current and only then when the push or pulling force applied by the cart operator exceeds a predetermined threshold. Usually, when the cart running wheel encounters no rolling resistance, the electric motors remain still.

The free programmable memory can be formed in different ways. When the free programmable memory is formed integrally with the computer, the computer can be provided with additional input formed as an interface for programming the memory from outside with, e.g., a personal computer equipped with an appropriate software.

The free Programmable memory can be formed as a replaceable insert formed as a pin-on or plug-in data carrier connected with a corresponding interface of the computer.

In a delivery cart having one front castor and two rear support wheels, the displacement stirrup is formed as a shaft pole provided with a single handle, and the sensors are mounted in the stirrup handle and includes a first pair of force meters for sensing displacement forces applied to the shaft pole in a longitudinal direction of the cart, and a second pair of force meters for sensing steering forces applied to the shaft pole in a direction transverse to the longitudinal direction of the cart. Each of the force meters is formed of strips of a foil material an electrical resistance of which changes dependent on a pressure force applied to a horizontal surface thereof. The handle has a grip bar having a vertically extending square-shaped member, and the force meters of the first pair of force meters and the force meters of the second pair of the force meters are arranged opposite each other in a respective direction on the square-shaped member. Mounting of the sensors in the stirrup grip bar permits to reduce the dimensions of the control block. The control unit is also mounted on the handle and is connected with the two electric motors.

In accordance with a modified embodiment of the delivery cart according to the present invention, the displacement stirrup can be provided with two, spaced from each other in a transverse direction, handles, and the sensor means comprises two pairs of force meters arranged in the two handles, respectively, opposite each other on an appropriate supports for sensing displacement and pressure forces applied to respective handles. Each of the force meters is formed of strips of a foil material an electrical resistance of which changes dependent on a pressure force applied to an entire surface thereof. The electric motors are formed as hub electric motors associated with the two support wheels, and the computer has a separate input associated with each of the two force meters mounted in a handle, and separate outputs associated with respective electric motors.

Independent from in which type of a delivery cart, the auxiliary drive according to the present invention is used and in the interests of standardization of the control system components, it is advantageously contemplated to form each of the inputs and the outputs of the computer as a plug-in connection interface. The cart further has first adapters for connecting the handles with the stirrup and second adapters for connecting the support wheels, which are formed integrally with respective wheel hub electric motors, with the chassis.

The formation of different constructional elements such as handles and/or the driven wheels as separate elements, which can be mounted, with appropriate adapters, practically on any cart and can replace corresponding elements already mounted on the carts, together with the provision of plug-in connection means for electrical connection of different elements, permits to provide a modular system the building blocks of which can be used for practically in all use conditions. This wide range insertion ability of separate building blocks of the modular system is made possible by the free programming of the control unit and because in the course of the control, adaptation of the functions of the elements to the requirements of carts with a different weight or different steering characteristics or the like takes place.

It is further contemplated to provide a sheathing for the grip bar of each separate handle, which is formed of an elastic material.

According to the present invention, the computer outputs, which are associated with respective electric motors, are connected with the respective electric motors by driving and end stages connected with respective plug-in interfaces of the computer. The control system of the power supply of the electric motors further includes a switch for turning the motors off.

According to the present invention, the delivery cart is provided with a display, which is formed preferably as a light emitting diode, for displaying the charge of the accumulators used as a power source for the electric motors.

Advantageously, as sensors, force meters are used because they are characterized by an operational reliability, have small dimensions and can be easily mounted inside a handle.

According to the present invention, in delivery carts having increased overall dimensions, the displacement stirrup is formed as a substantially U-shaped member formed of a tubular material, in which two legs of the U-shaped stirrup extend substantially vertically and have their free ends: fixedly secured to the chassis. The base portion of the U-shaped stirrup is bent out toward a user. The sensor means includes two sensors formed as torque meters or force meters and mounted, respectively, on the two legs of the U-shaped stirrup.

In an advantageous embodiment of the present invention, the two sensors, the torque or force meters, are arranged inside of the stirrup which is made of a tubular material. These sensors are designed for sensing linear forces acting in the longitudinal direction of the cart. The sensors are formed and arranged so that they sense forces acting in the same plane. Such sensors have a relatively simple construction and are, therefore, very economical. In addition, these sensors enable to precisely determine the turn-on threshold, at least within certain limits. This prevents an unintended movement of the cart as a result of an unintentional contact of the stirrup. Rather, a certain minimal force has to be applied to the stirrup in order to actuate the drive electromotor.

Naturally, the sensors can be supplemented with a time function element or the like arranged downstream of the sensors. The time function element can insure that actuation of the electric motors is effected with a predetermined time delay after a certain force is applied to the stirrup so that even a relatively strong accidental force applied to the stirrup would not result in the cart movement.

According to a further preferred embodiment of the present invention in a delivery cart with a U-shape stirrup in which the two sensors are mounted in the two legs of the stirrup, each sensor is associated with the electric motor which is provided on the same side of the chassis as the sensor-receiving leg of the stirrup, so that both sensors simultaneously sense the push or pulling force applied to respective legs and generate control signals for supplying a corresponding amount of power to the respective electric motors for actuating them in a respective, forward or backward direction. As a result of such an arrangement, with a symmetrical or centered application of forces to the stirrup, both electric motors are supplied with the same amount of power, corresponding to the magnitude of the force applied to the stirrup, and are simultaneously actuated for moving the cart in the respective, forward and backward direction, along a straight line with a speed corresponding to the applied force. With an asymmetrical application of forces to the stirrup and, in particular, one-sided application of forces, both electric motors are actuated in the same direction but are supplied with different amounts of power corresponding to the asymmetry of the force application, and the cart moves along a curve having a radius corresponding to the difference of forces applied to the opposite sides of the stirrup. When the forces are applied to the two opposite ends of the stirrup in opposite directions, the two electric motors would be also actuated in opposite direction, and the cart would rotate on the same spot.

There exist two possibilities of mounting the two sensors in the two legs of the U-shaped stirrup. The two sensors can be mounted either in foot portions of the two leg or the portions of the legs adjacent to the stirrup. In the first case, sensors formed preferably as torque meters are used, in the second case sensors formed preferably as force meters are used. In both cases, the sensors sense the moments or forces applied to the legs and generate appropriate signals for conducting power to the respective electromotors. The formation of the sensors, which are arranged in the foot portions of the two legs of the stirrup, as torque meters, permits, along with the simplified construction of the sensors, to simplify the entire control circuit and to achieve a greater insensitivity of the power supply control to an unintentional application of a force to the stirrup.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 1 shows a schematic perspective view of a chassis, together with sensors arranged in a displacement stirrup, of a delivery cart according to the present invention;

FIG. 2 shows a detail of the chassis shown in FIG. 1 at an increased scale;

DETAILED DESCRIPTION OF THE PREFERRED EMBODIMENTS

Figure 3:
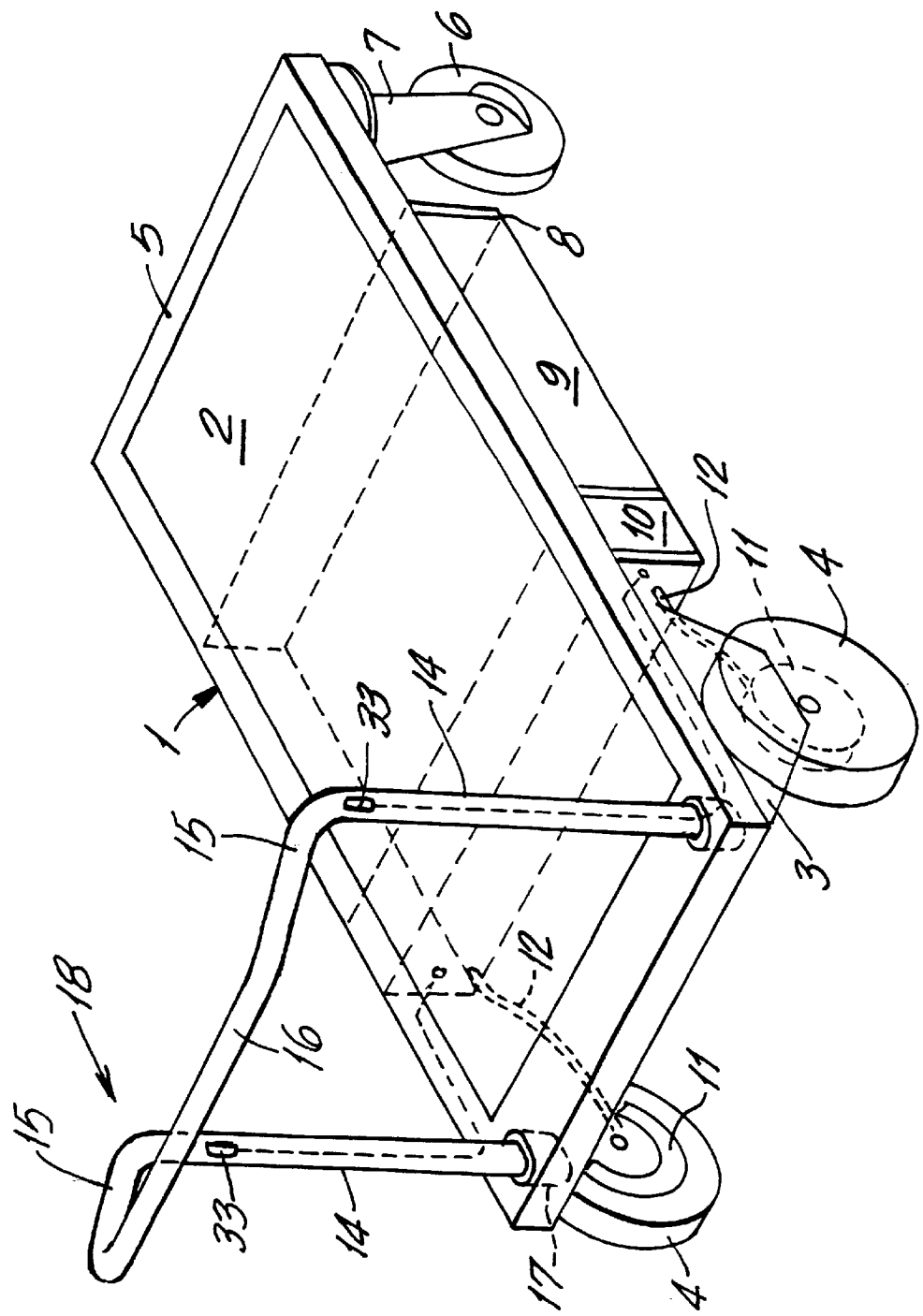
FIG. 3 shows a schematic perspective view of a chassis of a modified embodiment of a delivery cart according to the present invention, with the sensors being arranged in the displacement stirrup.

The chassis for a delivery cart according to the present invention, which is shown in the drawings, has a frame 1 which is formed of a sectional material and has contact surfaces 2 for supporting an interchangeable body, not shown. At opposite end of the frame 1, there are provided an axle support for non-pivotal about a vertical axis, support wheels 4 and a transverse bar 5 to which a yoke 7, which forms a suspension for castor 6, is attached. The cart chassis 1 further includes a pull-out box 8 for receiving a battery case 9 or accumulators. Adjacent to the battery case 9, there is provided a control switch group 10. The control switch group 10 is designed for controlling the power supply to the support wheels 4 from reversible load-actuated electric motors 11 which are formed as wheel hub motors. The control switch group 10 is connected with each electric motor 11 by a control and feed conduit 12. For generating actuation signals for the control switch group 10, there are provided sensors 13 which are formed as torque meters and which are shown only schematically in FIG. 1. Two split sockets 17 fixedly attach displacement stirrup 18 to the frame 1. The somewhat U-shaped stirrup 18 is formed, as particularly shown in FIG. 2, of a tubular material and has free ends of its both legs, which extend substantially vertically, fixedly secured to the frame 1. The base of the U-shaped stirrup 18 forms a transverse 16 bent out, at 15, toward the user. The transverse 16 serves as handle. In each of the legs 14 of the stirrup 18, there is provided, its foot region, a sensor 13 which, as discussed previously, is formed as a torque meter. The sensors 13 are located inside of the tubular legs 14. The sensors 13 are formed as torque meters for measuring torques acting in a placement extending in longitudinal direction of the cart. Each of the two sensors 13 is associated with a respective electric motor 11, namely, with that provided on the same side of the cart as the respective sensor 13. Thereby, appropriate push or pulling forces are applied to respective legs of the transverse handle 18 for moving the cart in forward or backward directions, respectively. Accordingly, when a user applies a symmetrical force, in the middle of the displacement stirrup 18, electric motors 11 are supplied with a power corresponding to the amount of a push or pulling force, applied to the displacement stirrup 18 and acting in the forward or backward direction, for linearly moving the cart forward or backward. When an asymmetrical force is applied to the stirrup 18, both electric motors 11 would still be supplied with power acting same direction but having a different value because the symmetrical application of the force to the stirrup 18, the cart would be moved along a curve the radius of which would correspond to the magnitude of the asymmetry of the force applied to the transverse handle. When the force is applied to opposite ends of the displacement stirrup 18 in opposite directions, the two electric motors 11 will be supplied with power acting in opposite direction so that the cart will rotate on the same spot.

The stirrup 18 can be formed as a torsion-proof handle, by providing a stiffening element.

In the embodiment of the cart according to the present invention which is shown in FIG. 3, sensors 33 which are formed as force meters, are provided in the transverse regions of the legs 14. Both sensors 33, as in the embodiment of FIGS. A 1–2, are located inside the tubular legs 14 and are formed as devices for measuring linear forces acting in a plane extending in the cart moving direction. In this embodiment, likewise with a symmetrical centered application of a force to the stirrup 18, both electric motors 11 are supplied with power corresponding to the magnitude of a push or pulling force, which is applied to the stirrup 18, and acting in the forward or backward direction.

Figure 7:
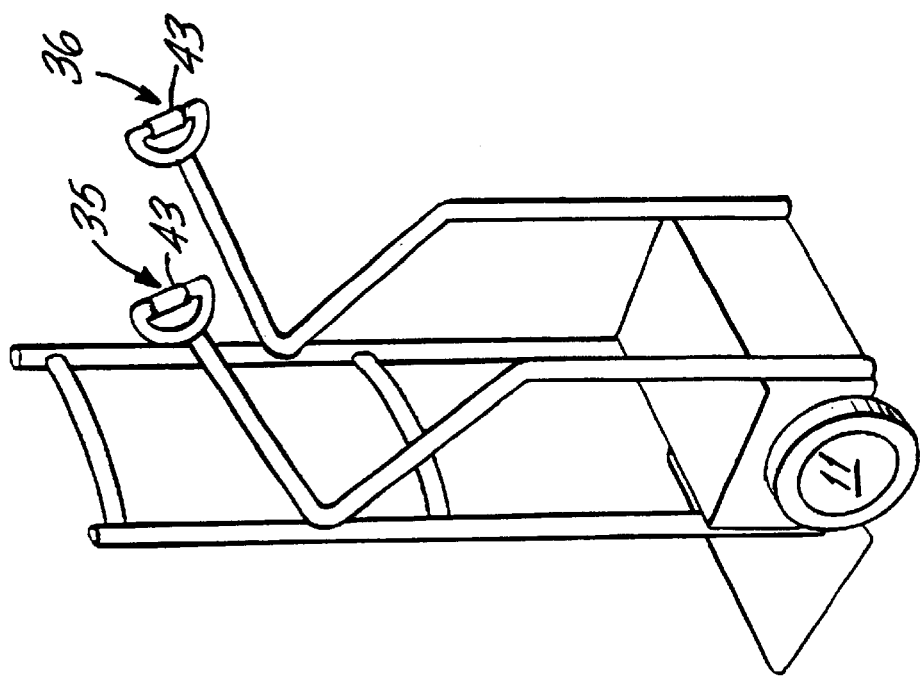
FIG. 7 shows a perspective view of a further embodiment of a delivery cart according to the present invention, with the sensors being arranged in both separate handles of the cart.
Figure 4:
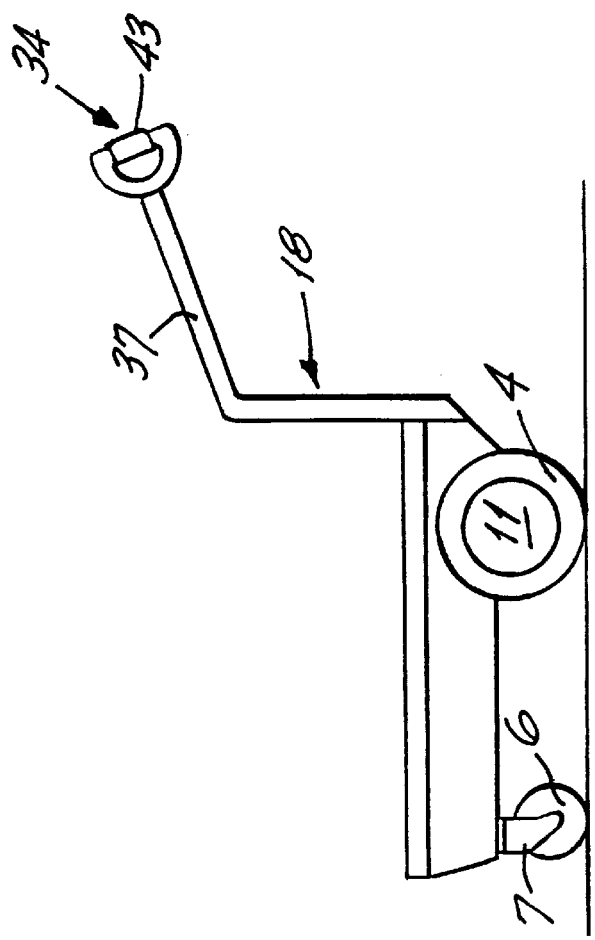
FIG. 4 shows a schematic perspective view of a chassis of another modified embodiment of a delivery cart according to the present invention, with the sensors being arranged in a single handle of the cart.
Figure 5:
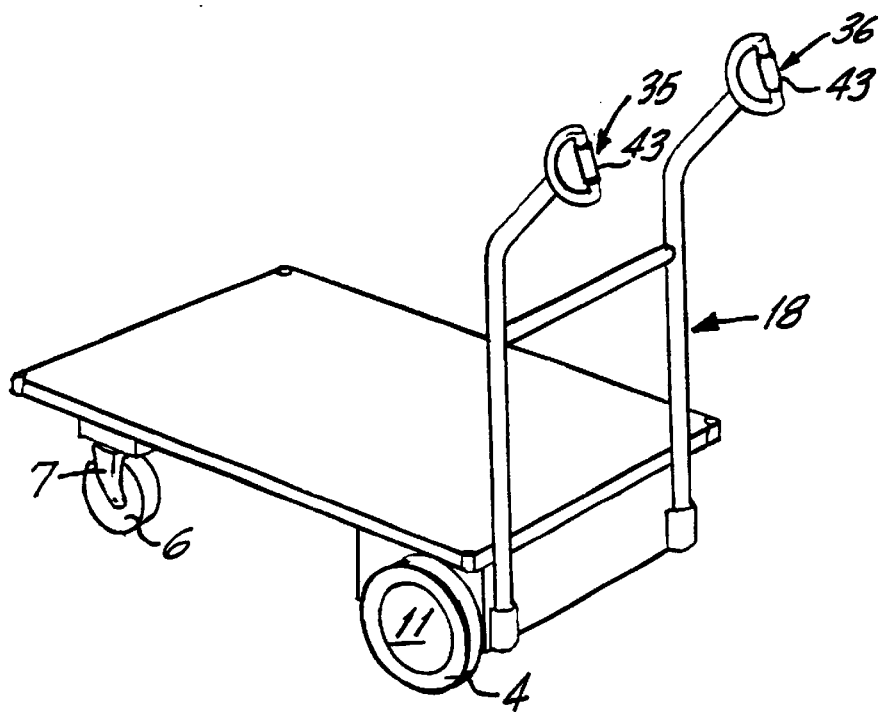
FIG. 5 shows a perspective view of a yet another modified embodiment of a delivery cart according to the present invention, with the sensors being arranged in two separate handles of the cart.
Figure 6:
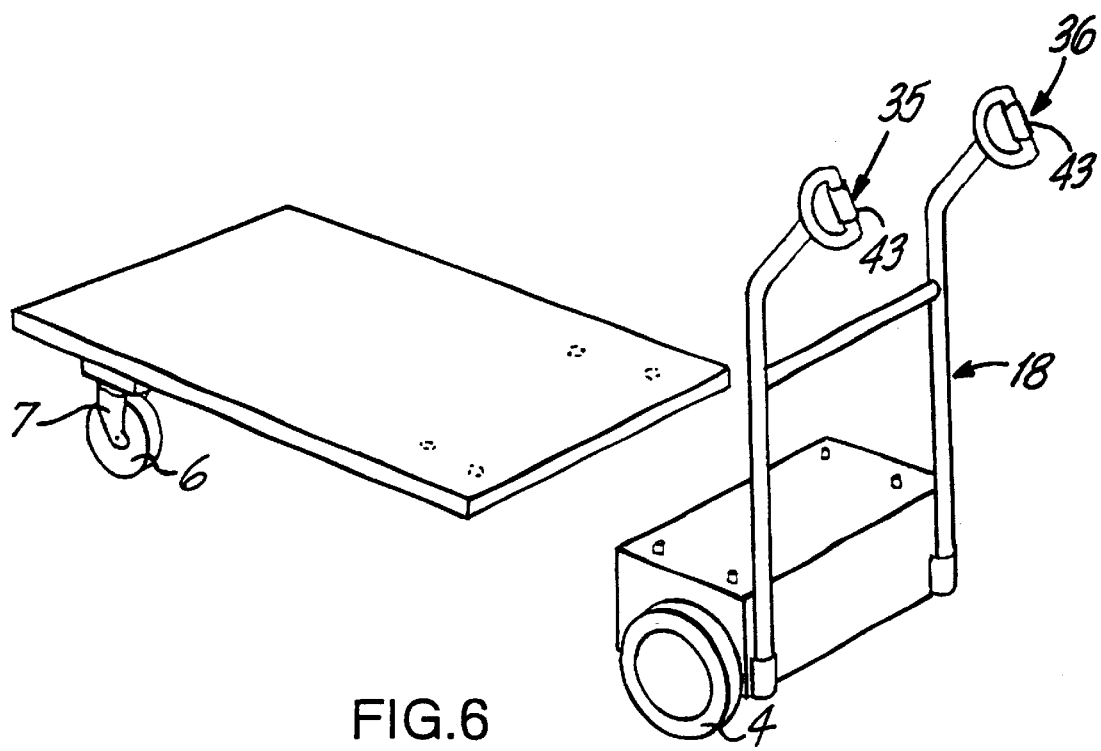
FIG. 6 shows an exploded view of the delivery cart shown in FIG. 5.

The carts according to the present invention, which are shown in FIGS. 4–7, can be displaced either with a single handle 34, the cart shown in FIG. 4, or with two separate handles 35, 36, the cart shown in FIGS. 5–7. In these carts, the sensors which are formed as force meters for measuring push or pulling forces applied to the cart and also steering forces, if necessary, are likewise mounted inside of respective handles 34, 35, 36.

Figure 9:
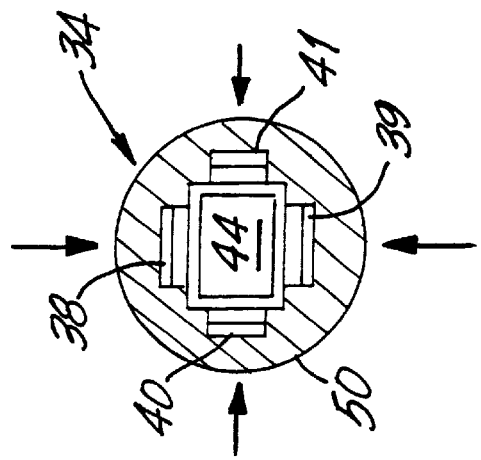
FIG. 9 shows a cross-sectional view of a handle for a single handle delivery cart according to the present invention.
Figure 8:
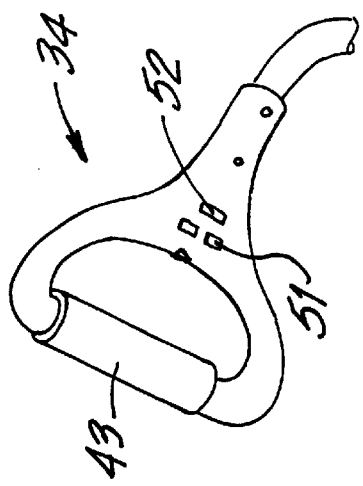
FIG. 8 shows a partial perspective view of a handle.
Figure 10:
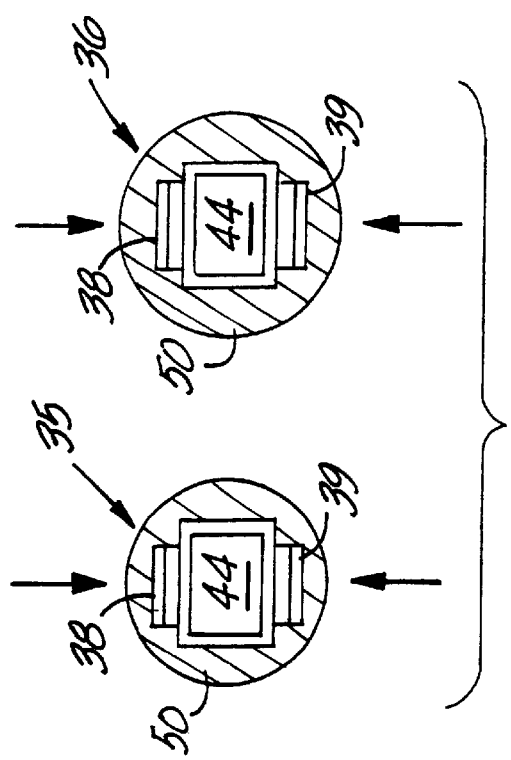
FIG. 10 shows a cross-sectional view of both handles for a two-handle delivery cart according to the present invention.

The delivery cart according to the present invention, which is shown in FIG. 4, has relatively small dimensions and is supported on the ground with rear support wheels 4, which are formed integrally with wheel hub motors, and a front castor 6. The cart has a stirrup 18 which is formed as a shaft pole 37 with a single handle 34. The handle 34, which is shown in FIG. 8 and a cross-section of which is shown in FIG. 9, has a first pair of sensors 38, 39 for sensing push and pulling forces applied to the shaft pole 37 in a longitudinal direction of the cart, and a second pair of sensors 40, 41 for sensing steering forces applied to the shaft pole 37 in a direction transverse to the longitudinal direction of the cart. The sensors 38–41 are formed as force meter and form part of a control unit 42 for controlling power supply to the wheel hub motors 11. The space-saving sensors 38–41 are mounted in the grip bar 43 of the handle 34 and are formed of strips of a foil material the electrical resistance of which varies dependent on a pressure force application the horizontal surface thereof. The respective sensors 38–41 are mounted opposite each in the longitudinal direction of the cart and in the transverse direction of the cart on a fixed inner member 44 of the grip bar 43 of the handle 34 which is attached to the shaft pole 37. The inner member 44 has a square shape and extends substantially vertically. The free programmable control unit 42 is mounted inside of the inner member 44 which is formed as a hollow body. The control unit 42 will be described in detail further below with reference to FIG. 11. Here it is suffice to say that the control unit 42 is connected with the wheel hub motors 11 of the support wheels 4 by conduits provided with connection plugs 45. In the embodiment of the delivery cart according to the present invention which is shown in FIGS. 5 and 6, the stirrup 18 of the cart, which is supported on the ground with two castors 6 and two rear support wheels 4, has two spaced, in a direction transverse to a longitudinal direction of the cart, handles 35 and 36. Each of the handles 35 and 36,. the cross sections of which are shown in FIG. 10, has two sensors 38 and 39 which are formed as force meters and are arranged opposite each other, in the longitudinal direction of the cart, on the inner member 44 of the grip bar 43 of the respective handle 35, 36. The sensors 38 and 39 are formed, as in the embodiment of a single handle shown in FIGS. 8–9, of strips of a foil material the electrical resistance of which varies dependent on a pressure force applied to its entire surface. The sensor 38 and 39 sense, as it has already been discussed previously, the push or pulling force applied to the cart.

In this embodiment of the inventive delivery cart, a separate input, defined by a plug 45, 46 of a computer 47 of the free programmable control unit 42 is associated with a respective one of the two-sensors 38, 39 mounted in each handle 35, 36. The computer 47 is mounted, independently of the handles 35, 36, on the chassis 1. For controlling of the respective wheel hub motors 11, the computer 47 has an output 48, 49 associated with the respective input, so that an actuation force applied to the respective handle 35, 36 results in a corresponding control of the wheel hub motor 11 provided on the same side of the cart as the handle 35, 36 to which the actuation force is applied.

The inventive delivery cart, which is shown in FIG. 7, differs from that shown in FIGS. 5–6 in that the cart has only two castors driven by respective wheel hub motors 11 and rotatable about a stationary axle. The control of the wheel hub motors 11, as well as the construction of the handles 35, 36 and the arrangement of sensors 38, 39, are the same as for a four-wheel, two-handle cart shown in FIGS. 5–6.

As it has already been described previously, the grip bar 43 of the handle 34, which is shown in FIG. 8, has a rigid inner member 44 having a rectangular shape and two opposite walls of which form supports for the sensors 38, 39. As it has been already described with reference to FIG. 9, when a single handle is used for moving the cart, for sensing of the steering forces, there are provided two additional sensors 40, 41, which are arranged opposite each other in a direction transverse to the longitudinal direction of the cart and are supported on another opposite pair of walls of the inner member 11.

Generally, the grip bar 43 of each separate handle 34, 35, 36 has a sheathing 50 which is elastically deformable within certain limits. In addition, a switch 51 for turning off the auxiliary drive of the delivery cart and a display 52, which is formed as a light-emitting diode 52, for displaying the charge condition of accumulators or batteries are provided on the handle.

Figure 11:
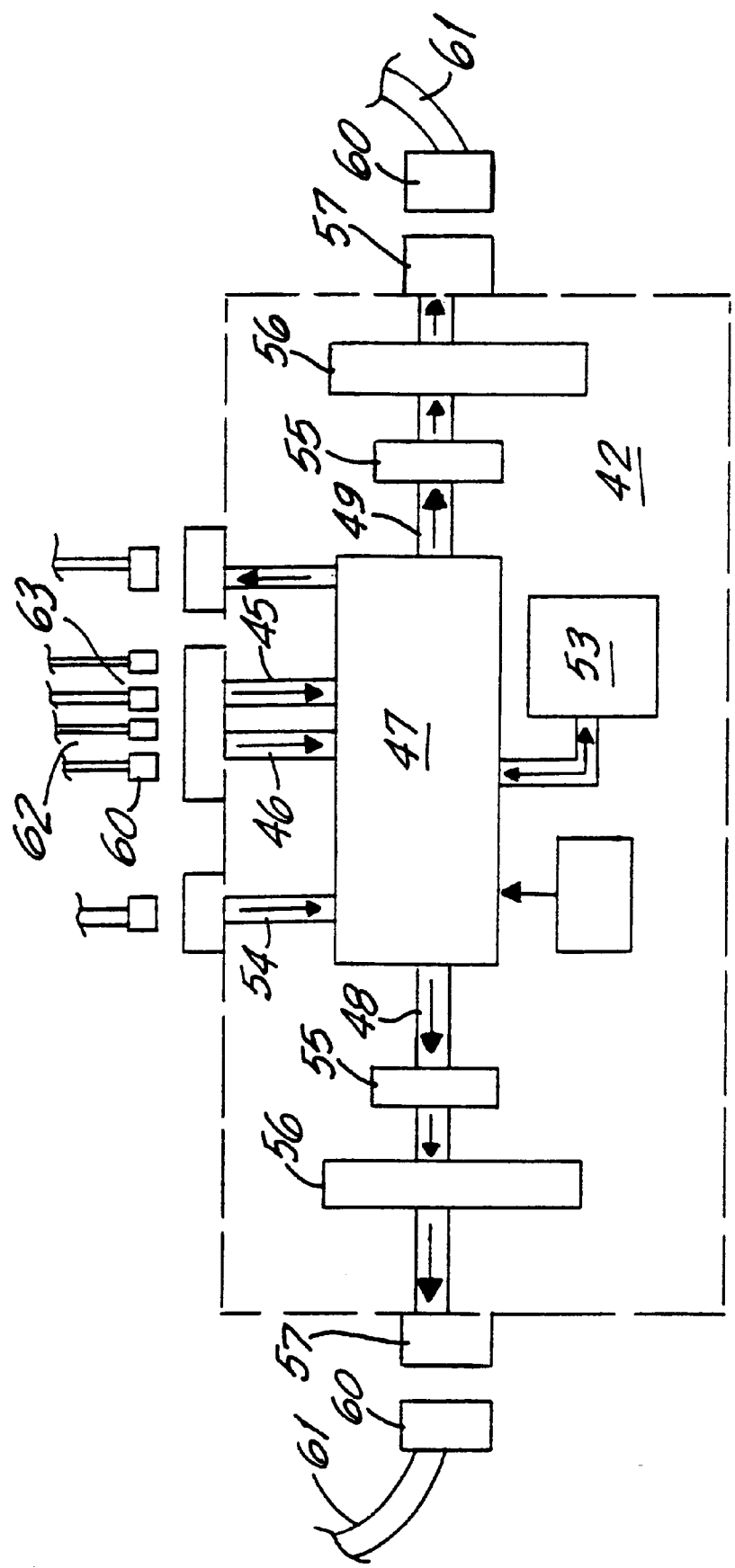
FIG. 11 shows a schematic view of a control circuit for a delivery cart according to the present invention.

The control unit 42, which is shown in FIG. 11, is used for controlling power supply to the fixed roll driving wheel hub electric motors 11. The control unit 42 is supported on a support and includes a computer 47 and a free programmable memory 53. The computer 47 has a separate input 45, 46 for each of the sensors 38–41 and a separate output 48, 49 corresponding to a respective output 45, 46 and associated with a respective one of the two electric motors 11. The free programmable memory 53 of the control unit 42 stores variable criteria for controlling current supply to the electric motors 11, such as an allowable actuation force applicable by a user, relationships between different operational characteristics of the cart and the like. The memory can be programmed dependent on the use conditions. In the embodiment shown in the drawing, the memory 53 is formed with the computer 47 as a single constructional unit. The memory 53 is programmed from outside through computer input 54 by special means 54a. As programming means, a personal computer provided with an appropriate software can be used. All of the inputs and connected with respective sensors and the power source by plug-type connection interfaces and appropriate conduits.

In particular, the outputs 48 and 49 of the computer 47, which are associated with respective wheel hub electric motors 11, are connected with respective interfaces, which are formed as plugs 57, by respective drive stages 55 and end stages 56.

Figure 12:
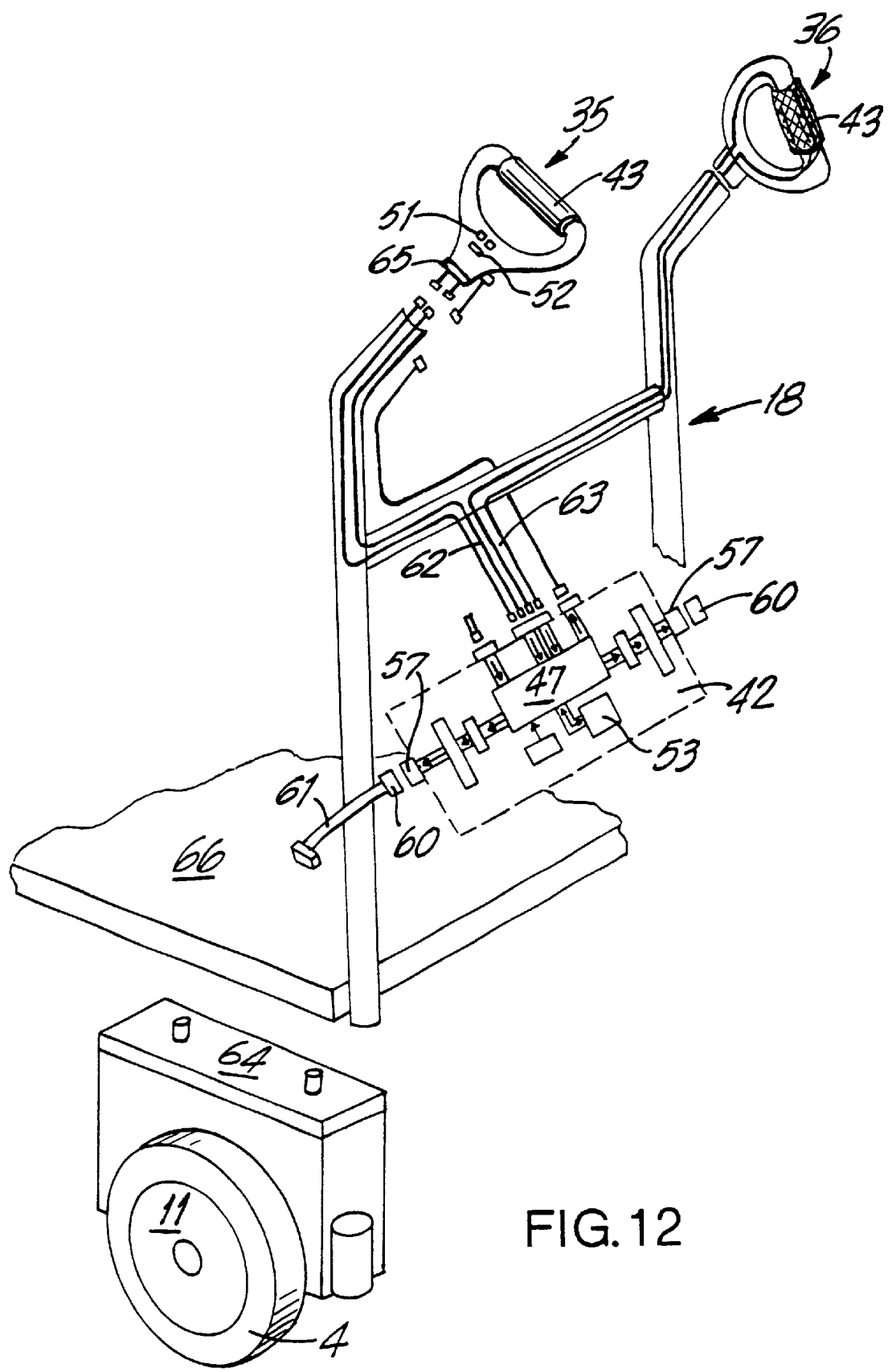
FIG. 12 shows a schematic exploded view of a delivery cart invention and provided with an auxiliary drive.

FIG. 12 shows a schematic simplified exploded view of a delivery cart according to the present invention with an auxiliary drive. As shown, in FIG. 12, the inputs 45, 46 and 54 and the outputs 48, 49 of the computer 47 of the control unit 42 are formed as plug-type interfaces connected with respective sensors 38 and 39, which are mounted in the handles 34 or 35, 36 and a control display 52, on one hand, and with the control elements of respective electric motors 11, which are provided also with plug-type interfaces 60, by conduits 61, 62, 63. The handles 35, 36 and the wheels 4, which are formed integrally with the drive motors 11, are connected with the chassis element 66 and the stirrup 18 by respective adapters 64 and 65.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claim is:

1. A delivery cart, comprising:
   a chassis formed of longitudinal and cross-beams;
   at least one castor pivotable about a vertical axis and two wheels for supporting the chassis on a ground;
   a displacement stirrup attached to the chassis and towering above the chassis;
   two gearless, load-actuated reversible electric motors associated with the two wheels and formed integrally with the two wheels;
   a power source for the electric motors; and
   control means for controlling power supply to the electric motors and including sensor means for sensing at least one of a displacement force and a steering force applied to the cart, and a free programmable, electronic control unit for controlling power supply to the electric motors in accordance with the one of said displacement force and said steering force,
   wherein the control unit comprises an electronic computer and a free programmable memory associated with the computer 1 wherein the sensor means comprises at least two sensors, and wherein the computer has a separate input for each of the at least two sensors and a separate output for each of the two electric motors,
   wherein the free programmable memory stores data used for actuating the electric motor means and for controlling power supply thereto, the data including an allowable force to be applied by the user and variably predetermined operational characteristics of the cart, and
   wherein the computer comprises a further input for programming the free memory from outside, and the delivery cart further comprises computer means connectable with the further input for programming the free programmable memory.

2. A delivery cart as set forth in claim 1, wherein the free programmable memory is formed as a replaceable insert formed as one of a pin-on data carrier and a plug-in data carrier, and wherein the computer has an interface to be connected with the data carrier.

3. A delivery cart as set forth in claim 1, wherein the displacement stirrup is formed as shaft pole provided with a single handle, and wherein the sensor means is mounted in the handle and comprises a first pair of force meters for sensing displacement forces applied to the shaft pole in a longitudinal direction of the cart, and a second pair of force meters for sensing steering forces applied to the shaft pole in a direction transverse to the longitudinal direction of the cart.

4. A delivery cart as set forth in claim 3, wherein each of the force meters is formed of strips of a foil material an electrical resistance of which changes dependent on a pressure force applied to a horizontal surface thereof, wherein the handle has a grip bar comprising a vertically extending square-shaped member, and wherein the force meters of the first pair of force meters and the force meters of the second pair of the force meters are arranged opposite each other in a respective direction on the square-shaped member.

5. A delivery cart as set forth in claim 1, wherein the two electric motors are formed as wheel hub electric motors formed integrally with the two wheels, wherein the displacement stirrup is formed as a shaft pole with a single handle, and wherein the control unit is mounted on the handle and is connected with the two electric motors by control conduits provided with plug-in connection means.

6. A delivery cart as set forth in claim 1, wherein the displacement stirrup is provided with two, spaced from each other in a transverse direction, handles, wherein the sensor means comprises two pairs of force meters arranged in the two handles, respectively, opposite each other on an appropriate support for sensing displacement and pressure forces applied to respective handles, and wherein each of the force meter is formed of strips of a foil material an electrical resistance of which changes dependent on a pressure force applied to an entire surface thereof.

7. A delivery cart as set forth in claim 6, wherein the computer has a separate input associated with each of the two force meters mounted in a handle, and a separate output associated with a respective electric motor.

8. A delivery cart as set forth in claim 7, wherein each of the inputs and the outputs of the computer is formed as a plug-in connection interface, and wherein the cart further comprises first adapter means for connecting the handles with the stirrup and second adapter means for connecting the wheels, which are formed integrally with respective wheel hub electric motors, with the chassis.

9. A delivery cart as set forth in claim 7 wherein the computer comprises driving and end stages for connecting respective outputs with respective electric motors and connected with respective plug-in interfaces of the computer, and wherein the control means further comprises a switch for turning the electric motors off.

10. A delivery cart as set forth in claim 1, wherein the stirrup is provided with at least one handle, wherein the power source comprises accumulator means and wherein the cart further comprises display means mounted on the handle and showing an accumulator charge.

11. A delivery cart as set forth in claim 10, wherein the display means comprises a light-emitting code.

12. A delivery cart as set forth in claim 6, wherein each of the two handles comprises a grip bar provided with sheathing formed of an elastic material, and wherein each pair of force meters is mounted in the grip bar of a respective handle.

13. A delivery cart as set forth in claim 1, wherein the displacement stirrup is formed as substantially U-shaped member formed of a tubular material, wherein two legs of the U-shaped stirrup extend substantially vertically and have free ends thereof fixedly secured to the chassis, and wherein a base portion of the U-shaped stirrup is bent out toward a user, and wherein the sensor means comprises two sensors formed as one of torque meters and force meters and mounted, respectively, on the two legs of the U-shaped stirrup.

14. A delivery cart as set forth in claim 13, wherein the two sensors are mounted inside the legs for sensing forces acting in a longitudinal direction of the cart.

15. A delivery cart as set forth in claim 14, wherein each sensor is associated with an electric motor provided on a same side of the chassis as the sensor receiving leg of the U-shaped stirrup.

16. A delivery cart as set forth in claim 15, wherein the two sensors are formed as torque meters and are arranged in foot portions of the respective legs for generating control signals in accordance to torques applied to respective electric motors.

17. A delivery cart as set forth in claim 15, wherein the two sensors are formed as force meter and are arranged in portions of the leg adjacent to the base of the U-shaped stirrup for sensing forces applied to the base by a user and for generating control signals communicated to the control unit.

18. A delivery cart as set forth in claim 1, wherein the electric motors are wheel hub motors.

* * * * *